Dec. 26, 1939.   W. S. GRAHAM   2,184,422
HARVESTING MACHINE FOR BEETS AND THE LIKE
Filed Dec. 2, 1937   2 Sheets-Sheet 1

Inventor
William S. Graham
By V. F. Lassagne
Atty

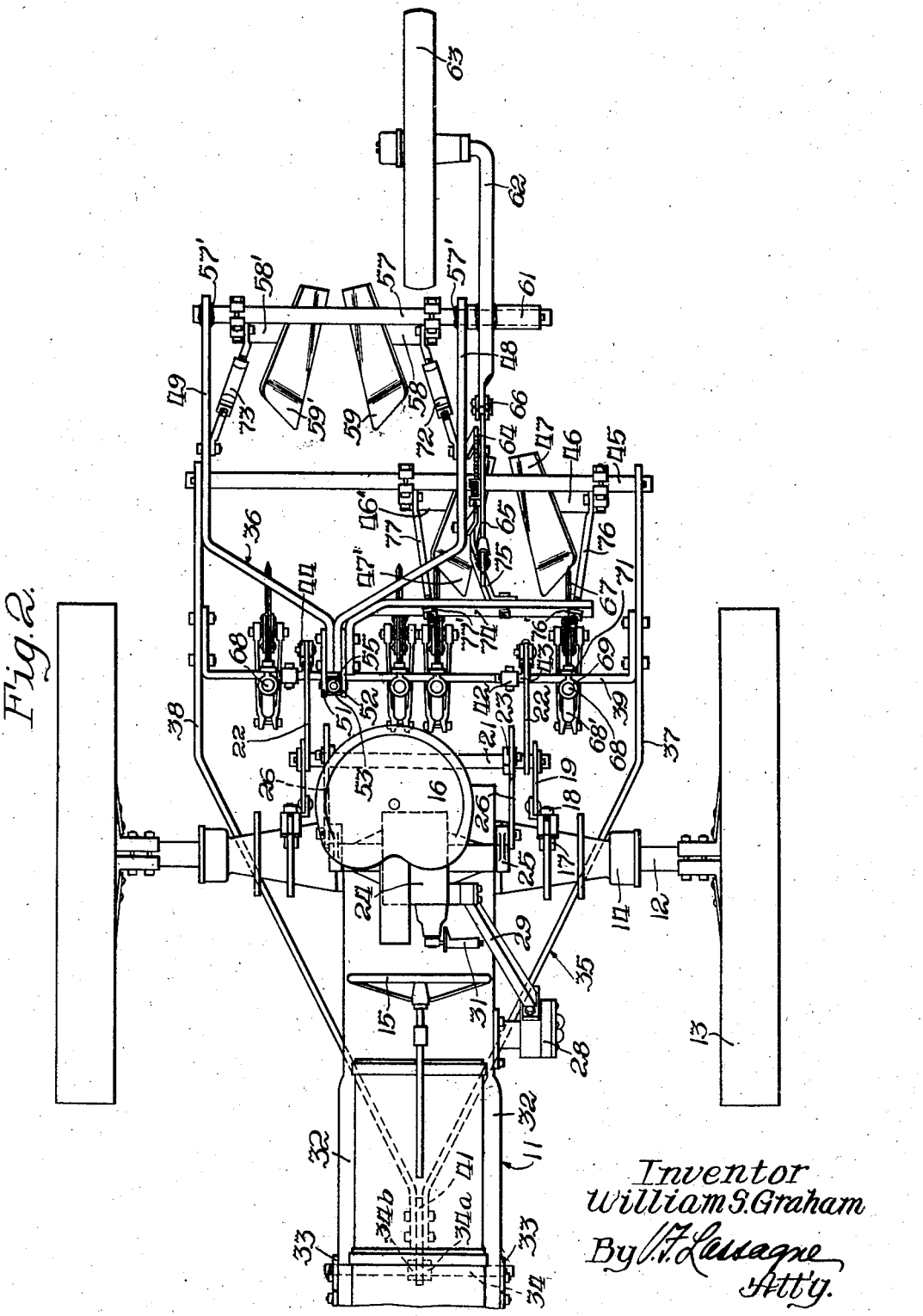

Patented Dec. 26, 1939

2,184,422

UNITED STATES PATENT OFFICE 2,184,422

HARVESTING MACHINE FOR BEETS AND THE LIKE

William S. Graham, Canton, Ill., assignor to International Harvester Company, a corporation of New Jersey Application December 2, 1937, Serial No. 177,659

34 Claims. (Cl. 55—106)

This invention relates to harvesting machines for beets and the like, and particularly to harvesting machines adapted to be moved to and from ground position by power means on a tractor.

An object of the invention is to provide a tractor mounted harvesting machine which has but one ground supporting wheel that follows the tractor wheel at a location other than in the tracks left by the tractor wheels.

Another object of the invention is to provide a harvesting machine which, in its ground working position, has substantially free floating movement relative to the tractor, by which its path of movement is controlled by a previously prepared irrigation ditch or other depression in the ground between adjacent crop rows which the single ground engaging wheel of the machine is adapted to follow.

Another object of the invention is to provide a multiple-row harvesting machine in which the points of entrance of each of the ground working tools may be adjusted quickly in unison, and with a minimum effort.

In general, the invention comprises a laterally and longitudinally extending main frame pivotally attached to a tractor of the tricycle type at a point intermediate its steering and rear wheels, and connected to the rear of the tractor so as to have a free lateral and vertical movement about its forward connection when the same is in its ground-working position. Power means is provided on the tractor for raising and lowering the implement to and from its ground-engaging position and provided with a lost-motion connection to permit free movement of the machine relative thereto after lowering the machine to its ground-engaging position. On this main frame is mounted an auxiliary frame having one pair of puller blades mounted thereon adapted to have their points of entrance to the ground adjusted by pivotal adjustment of the auxiliary frame about a point of contact with the ground of a single gauge wheel carried by this auxiliary frame, and means connecting the pair of blades on the auxiliary frame with the pair of blades mounted for movement on the main frame, so that movement of the auxiliary frame will effect an adjustment of both pairs of blades in unison. The single gauge wheel in ground-working position of the implement follows a previously prepared irrigation ditch, the machine being controlled in its lateral movement thereby.

For a better understanding of the invention reference may be had to the following detailed description taken in connection with the accompanying drawings, in which:

Figure 2 is a plan view of a portion of a tractor and of the implement of the present invention; and, Figure 3 is a rear view of a portion of a tractor and showing the connections between the machine and the power means on the tractor.

Figures 1, 3:
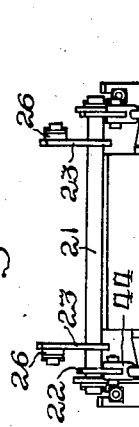
Figure 1 is an elevational view of a tractor, showing the harvesting machine connected thereto, and in its ground-working position.

Referring to the drawings, there is shown a tractor 11 having a rear axle 12, on which are fixed drive wheels 13 and rear axle housings 14 extending laterally of the tractor and enclosing the axles 12. The tractor also has steering wheels, not shown, forward of the drive wheels 13 adapted to be steered by a hand wheel 15 near the operator's station 16. At the rear of the tractor and attached to the rear axle housings 14 are vertically extending attaching plates 17, which carry the usual swing bolts 18. Quickly attachable to these attaching plates 17 are two rearwardly and upwardly extending bracket plates 19, which carry a transversely extending rock-shaft 21, having rigidly attached thereto rearwardly extending lifting arms 22 and an upwardly extending operating arm 23. On the tractor is a power lift device 24 having a crank-arm 25 adapted to be swung to and fro to operate a pitman link 26, which will engage the arm 23 of the rock-shaft 21 to rock the same. The pitman 26 preferably has a slot 27 to provide for lost motion of the arm 23 with respect to the pitman 26 when the harvesting machine is in its ground-working position. The power lift device 24, as shown, is of the hydraulic type, in which fluid pressure is developed by the pump 28 on the side of the tractor and is delivered through a conduit 29 to the power lift device 24 at the will of the operator, upon operation of a control means 31. The power lift device 24 has preferably connected thereto two pitmans 26 at each side thereof, as shown more clearly in Figures 2 and 3, each of which has a lost motion connection with their respective rock-shaft arms 23. Since arms 22 are rigid on the rock-shaft 21, the combination of the arms and shaft forms in effect a stabilizing means for maintaining the machine level, the same being free when the machine is in its working position because it has the lost motion connection with the power lift device 24.

Bolted to the side sills 32 at each side of the tractor are spaced, downwardly extending hitch plates 33, at the lower ends of which is mounted a transverse shaft 34. Longitudinally, these plates are positioned at a location intermediate the steering wheels and rear wheels of the tractor.

The harvesting machine comprises generally a main frame 35 and an auxiliary frame 36. The main frame 35 has two longitudinally extending side frame members 37 and 38, which converge toward a forward point, and which are held in spaced relation by a transverse frame member 39 having its ends bolted respectively to the side frame members 37 and 38. The forward ends of the side frame members 37 and 38 are connected to a single draw-plate 41, which, in turn, is pivotally connected to the transverse shaft 34 carried by the hitch plates 33. The connection with this shaft 34 is preferably loose, so that the main frame 35 may slide along the shaft 34, or be tilted with respect thereto. Collars 34a and 34b tend to hold the plate 41 from shifting along the shaft 34 to any great extent.

The transverse member 39 connects the side frame members 37 and 38 at a location substantially in vertical alinement with the rear ends of the lifting arms 22. On the member 39 are fastened inverted U-shaped members 42, Figure 3, adapted to surround horizontally extending portions of lift links 43 extending vertically and having longitudinally extending, turned-over portions on their upper ends adapted to be enclosed and carried by U-shaped members 44 connected to the ends of the lift arms 22. The ends of the lift links 43 are thus so fashioned with the respective U-shaped members as to permit free lateral movement of the main frame 35 relative to the lifting arms 22. By having the ends of the links 43 turned at right angles with respect to each other, movement of the frame 35 longitudinally and laterally will be permitted with respect to the lifting means and to the tractor.

The rear ends of the side frame members 37 and 38 of the main frame 35 preferably are shaped to extend upwardly and rearwardly and have mounted therein a transverse, rotatable or rockable tool carrying member 45, which may rotate therein, and to which are connected vertically extending left and right tool beams 46 and 46', carrying at their lower ends respectively left and right puller blades 47 and 47', which travel in the soil under the beets to effect lifting of the same as the machine travels forwardly to harvest them. The beams 46 and 46' are connected to the rotatable rockable member 45 by means of clamps, so that a lateral adjustment of the beams along the member 45, to and from each other, can be effected to move the blades closer or farther apart, and also permit movement of the two together for adjustment of different row spacings relative to the second pair of puller blades on the machine. An individual adjustment of the tool beams 46 and 46' to aline or adjust the points of entrance of their respective puller blades 47 and 47' may also be made.

The auxiliary frame 36 is generally of the same shape as the main frame, but is considerably smaller and is mounted for pivotal adjustment on the rotatable tool carrying shaft 45 of the main frame 35. It comprises generally two side plates 48 and 49, converging at a point near their forward ends and connected together between two plates 51 and 52 by means of bolts. Between these plates 51 and 52, is pivotally mounted a trunnion 53, through which there extends an upwardly extending threaded member 54 connected to and carried by the transverse member 39 of the main frame 35. To adjust the auxiliary frame 36 about the shaft 45, there are two adjustable nuts 55 and 56, which are adjusted together upwardly or downwardly, depending upon the nature of the adjustment with the auxiliary frame 36 that may be desired.

The side plates 48 and 49 extend rearwardly of the main frame 35 and have fixed thereto a tool shaft 57, such as by welding, as indicated at 57', on which are adjustably mounted beams 58 and 58' having, respectively, puller blades 59 and 59'. The connection of the beams 58 and 58' with the shaft 57 is by means of clamps similar to the connection of the beams 46 and 46' to the shaft 45 of the main frame. By this arrangement it will be noted that the pair of blades connected to the auxiliary frame is located at a position offset from the pair of blades on the main frame.

The shaft 57 of the auxiliary frame 36 projects through the side plate 48 thereof to a sufficient extent to carry a sleeve member 61 having a gauge wheel carrying beam 62 rigidly secured thereto, and the lower end of which carries a gauge wheel 63. On the auxiliary frame and movable therewith is a quadrant member 64 carrying a lever 65 adapted to be adjusted with relation thereto, and the lower end of which is connected to a link 66 to adjust the gauge wheel beam 62 and gauge wheel 63 about the shaft 57, to regulate the working depth of the puller blades. The connection of the auxiliary frame 36 at its forward end with the main frame, being rigid, any adjustment of the gauge wheel will move the entire machine about the pivot point 34. By the use of this quadrant lever type of adjusting means, the adjustment is very fast and has an advantage over the more usual screw type of adjusting devices.

It is common today, in those sections of the country where irrigation has been made possible, to provide between the rows of planted crops a small irrigation ditch, by which water may be supplied to the crops during their growing season. This ditch remains very pronounced throughout the season and is present at the time the crop is to be harvested. In the absence of such ditches, there is usually a sufficient depression between adjacent crop rows resulting from cultivating and hoeing, which the single wheel 63 tends to follow. Inasmuch as this wheel will not follow the wheel tracks, as in prior constructions where the machine is supported on two wheels, each of which is behind the respective tractor wheels, any irregularity due to digging of the tractor, particularly in slippery ground, is not imparted to the machine to throw the blades out of alinement with the beets to destroy them.

When the machine is lowered from the tractor by the power lift device 24, its full weight is on the ground and the gauge wheel 63 lies in the irrigation ditch between two rows of beets to be pulled by the pairs of puller blades. Longitudinally of the machine, the gauge wheel 63 is in alinement with the connection of the frame 35 to the hitch plate 33. Due to the slot 27 in the pitman 26, the machine may have free vertical movement with respect to the power lift means 24, and the rock-shaft 21 may rock to and fro as the tractor proceeds over swales in the ground. By the connection in the U-shaped members 44 of the lift links 43, the machine is also free to move laterally as it is guided by the irrigation ditch. Thus, it may be said that the entire machine has substantially free floating movement in its ground-working position.

The use of a single gauge supporting wheel, such as used in the present invention, has also a further advantage over the use of wheels on the frame spaced to bridge a plurality of crop rows. With two wheels there is a tendency, upon traversing swales in the ground, for one side of the harvesting machine to dig deeper on one side than on the other, thus causing the beets on the other side possibly to be mangled or cut off. In other words, the respective pairs of puller blades have a tendency to be thrown out of vertical alinement with each other and with their respective crop row. It has been found, with the use of a single gauge wheel, that the machine will pass over swales without tilting to throw the pairs of puller blades out of alinement. The wheel 63, running down in the irrigation ditch, maintains the harvesting machine in substantially the proper lateral alinement as well as in the proper vertical alinement of the pairs of blades at all times.

In order to prevent the leaves of the beets, which at the time of harvesting are turned down over the beets and extend into the rows between them, from collecting about the puller beams and clogging the machine, pairs of notched colter wheels 67 are arranged in vertical alinement to cut the leaves at each side of the beets prior to pulling the same. By the present construction, these colter wheels 67 are mounted on the transverse member 39 for lateral adjustment thereon. The colter wheels are fastened to off-set standards 68 connected to the flat side of the transverse member 39 by eye-bolt means 69 and clamping plates 71. It is preferable to have the off-set portion 68' of the standard 68 running forwardly rather than laterally, as there is less tendency for the same to disturb beets which have already been pulled from adjacent rows. Whenever the puller blades are adjusted, the colter wheels may accordingly be adjusted along the transverse member 39 into longitudinal alinement therewith. The colter wheels should be set to cut as deep as possible in order to insure cutting of all of the leaves on the beets.

Once the puller blades 59 and 59' have been adjusted and arranged on the shaft 57 of the auxiliary frame 36, pull straps 72 and 73 may be connected between the respective puller blade beams 58 and 58' to the side plates 48 and 49, respectively. Due to the free movement of the main frame 35 up and down, about the shaft 34 between the hitch plates 33, it will be apparent that any adjustment of the nuts 55 and 56 along the threaded member 54 will permit pivoting of the auxiliary frame and its blades associated therewith about the gauge wheel 63, the frames buckling relative to each other. By such an arrangement, a rather large adjustment of the points of entrance of the blade is effected upon only a slight turn of the adjustment nuts 55 and 56; in other words, for a given movement between two limits on the threaded member 54, a greater amount of movement of the points of entrance of the puller blades is effected about the gauge wheel than with a construction where this adjustment would be made relative to a main carrying frame only. Thus there has been provided by the present construction a quick form of angular adjustment for the points of entrances of the puller blades.

In order to effect adjustment of the pair of blades on the main frame and to provide means to which pull straps for the respective blades may be attached, a laterally extending bracket 74 is connected to the forward end of the auxiliary frame, by means of the same bolts connecting the plates 51 and 52 to the converged ends of the frame 36. It is braced at the side by a brace 75 connected with the side plate 48. The puller blade beams 46 and 46' are respectively connected to this bracket 74 by the adjustable pull straps 76 and 77. To effect easy connection of the ends of the pull straps with the bracket 74, the bracket 74 is preferably twisted to be at an angle so the straps will pass through holes in the bracket 74 and adjusting nuts 76' and 77' will flatly engage the forward face thereof. Thus any movement of the auxiliary frame 36 will impart rotation to the blade beams 46 and 46' and rotatable shaft 45 and cause adjustment of the pair of blades on the main frame in unison with the adjustment of the blades on the auxiliary frame.

From the foregoing description, it should now be apparent that there has been provided a harvesting machine of the multiple-row type adapted to have floating movement with the ground, and controllable thereby, and in which the adjustment of the multiple pairs of puller blades may be accomplished quickly and in unison by simple means.

While various modifications in the specific construction of the present invention may be apparent, it is deemed that these modifications shall be within the spirit and scope of the appended claims.

What is claimed as new is:

1. In a multiple-row harvesting machine for beets and the like, a frame, pairs of working blades mounted on said frame, and means for adjusting the angle of the points of entrance of said pairs of blades in unison.

2. In a multiple-row harvesting machine for beets and the like, a frame, pairs of working blades independently mounted on said frame for tilting angular adjustment of the points of entrance of the same with respect to the frame and to each other, means for connecting the separate pairs of blades together, and means for imparting adjustment to one pair of blades whereby another pair of blades will be automatically adjusted.

3. In a multiple-row harvesting machine for beets and the like, a main frame, a pair of working blades mounted on said main frame, an auxiliary frame mounted for tilting adjustment on said main frame and a second pair of working blades mounted thereon, means interconnecting the first and second mentioned pairs of blades, and means for adjusting the auxiliary frame whereby both pairs of blades will be adjusted in unison.

4. In a multiple-row harvesting machine for beets and the like, a main frame, a pair of working blades mounted on the frame for tilting adjustment as a pair and for individual adjustment with respect to each other, an auxiliary frame mounted for tilting adjustment on said main frame, a second pair of working blades mounted on the auxiliary frame for tilting adjustment as a pair and for individual adjustment with respect to each other, means for interconnecting the first and second mentioned pairs of blades, and means for adjusting the auxiliary frame whereby all blades will be adjusted in unison.

5. In a harvesting machine for beets and the like, a frame having a rockable transverse member, puller blades attached to said rockable member, and means for rocking said member to effect the angular pulling adjustment of the blades in unison.

6. In a harvesting machine for beets and the like, a frame having a rockable transverse member, puller blades independently mounted on said transverse member and adapted to be adjusted individually along the member and angularly with respect to the member, and means for rocking said member to adjust the blades in unison when they have been individually adjusted with respect to each other.

7. In a multiple-row harvesting machine for beets and the like, a main frame having a rockable transverse member, a pair of puller blades attached to said rockable member, an auxiliary frame mounted for tilting adjustment on said main frame, a second pair of puller blades carried thereon, and means whereby said rockable transverse member and puller blades thereon will be adjusted upon adjustment of the auxiliary frame.

8. In a multiple-row harvesting machine for beets and the like, a main frame having a rockable transverse member, a pair of puller blades attached to the rockable member, an auxiliary frame mounted for tilting adjustment on said transverse member, a second pair of puller blades carried on the auxiliary frame, and means whereby said rockable transverse member and puller blades thereon will be adjusted upon adjustment of the auxiliary frame.

9. In a multiple-row harvesting machine for beets and the like, a frame, pairs of puller blades adjustably mounted on said frame for different row spacings, a transverse member on said frame located forwardly of said pairs of puller blades, and colter wheels laterally adjustable on said transverse member to correspond with different row spacings of the puller blades.

10. In combination, a tractor, a ground-working implement comprising a frame adjustably connected to the tractor, a ground tool mounted on said frame and adapted to be tilted with respect thereto for varying its angle of entrance into the ground, a second frame pivoted on said first mentioned frame, means for connecting the tool to the second frame wherein any pivotal movement of the second frame will be imparted to tilt the tool, and an implement supporting wheel carried by the second frame, whereby any slight adjustment of the second frame to tilt the tool on the first frame is about the implement supporting wheel as a pivot point.

11. In combination, a tractor, a ground-working implement comprising a frame connected to the tractor, a ground-working tool mounted on said frame and adapted to be tilted with respect thereto for varying its angle of entrance into the ground, a second frame mounted for pivotal adjustment on said first mentioned frame, a ground-working tool mounted on said second frame adapted to have its angle of entrance into the ground varied upon the pivotal adjustment of said second frame on said first frame, means whereby movement of said second mentioned frame to vary the angle of entrance of its tool mounted thereon will be automatically imparted to the first tool to thereby tilt both tools in unison, and a supporting wheel for the entire implement mounted on said second frame and arranged so that adjusting movement of the second frame to adjust the tilt of the tool is about the supporting wheel.

12. In combination, a tractor, a ground-working implement comprising a frame connected to the tractor, a ground-working tool mounted on said frame and adapted to be tilted with respect thereto for varying its angle of entrance into the ground, a second frame mounted for pivotal adjustment on said first mentioned frame, a ground-working tool mounted on said second frame adapted to have its angle of entrance into the ground varied upon the pivotal adjustment of said second frame on said first frame, means whereby movement of said second mentioned frame to vary the angle of entrance of its tool mounted thereon will be automatically imparted to the first tool to thereby tilt both tools in unison, and a depth-adjustable support wheel with associated adjusting means for the entire implement carried by the second frame serving to regulate the working depth of the working tools and to act as a pivot point when adjusting the second frame to vary the points of entrance of the working tools into the ground.

13. In combination, a tractor of the tricycle type with its steering wheels forward of the drive wheels, a harvesting machine for beets and the like connected to the tractor to be pulled thereby from a point intermediate the steering and drive wheels of the tractor and adapted to have substantially free floating movement in its ground-working position, and means for supporting the rear of the machine in its ground-working position.

14. In combination, a tractor, a harvesting machine for beets and the like pivotally connected at one location on the tractor to be pulled thereby, power means on the tractor to lift and lower the machine with respect to its ground-working position, lost-motion means between the power means and the harvesting machine to permit substantially free floating movement of the machine with respect to the tractor in its ground-working position, and a gauge wheel for supporting the machine in its ground-working position.

15. In combination, a tractor, a harvesting machine for beets and the like connected to the tractor to be pulled thereby, the connection being such as to give substantially free floating and lateral movement of the machine when in its ground-working position, and a single ground-supporting wheel at the rear of the machine adapted to run in an irrigation ditch in the ground to control the path of movement of the machine.

16. In combination, a tractor of the tricycle type with its steering wheels forward of the drive wheels, a multiple-row harvesting machine for beets and the like connected to the tractor to be pulled thereby from a point intermediate the steering and drive wheels of the tractor, the rear of the machine adapted to have substantially free floating and lateral movement in its ground-working position, working tools offset equally from a middle line through the machine to harvest spaced rows of beets and the like, and a single ground-supporting wheel adapted to follow and be controlled by a previously prepared ditch in the ground intermediate the spaced rows of beets and the like.

17. In combination, a tractor having a rear axle, an implement comprising a primary frame having converging side members with its apex pivotally attached to the tractor at a point forward of the rear axle, and a cross-member connecting the side members at a location rearwardly of the rear axle, ground-working tools carried by the frame to one side of the longitudinal median line of the tractor, and a similarly shaped auxiliary frame connected to the cross-member and carrying other ground-working tools on the other side of said median line, and a common ground support for said frames in their ground-engaging position.

18. In a harvesting machine for beets and the like, a frame, two spaced working blades carried by said frame, and means for adjusting the angle of the points of entrance of said blades in unison.

19. In a harvesting machine for beets and the like, a frame, pulling blades carried by the frame, separate means for adjusting the angle of the point of entrance of each individual blade, and means for adjusting the angle of the points of entrance of all of the blades in unison.

20. In a harvesting machine for beets and the like, a frame, a pair of puller blades mounted on the frame, puller straps connected to each of the blades and to the frame, and means for adjusting the points of connection of the puller straps to the frame to effect adjustment of the points of entrance of the blades in unison.

21. In a harvesting machine for beets and the like, a main frame, an auxiliary frame, puller blades carried by the auxiliary frame, and means for adjusting the auxiliary frame with respect to the main frame to effect angular tilting adjustment of the points of entrance of the blades.

22. In a harvesting machine for beets and the like, a frame, a puller blade mounted for tilting adjustment on the frame, a second puller blade mounted for tilting adjustment on the frame, means interconnecting the first and second blades, and means for adjusting one of said blades, whereby the other of said blades will be automatically adjusted in unison.

23. In a harvesting machine for beets and the like, two frames connected together for buckling movement with respect to each other, means on each of the frames for supporting themselves, puller blades carried by one of the frames, and means for adjustably buckling the frames with respect to each other to effect adjustment of the points of entrance of the puller blades.

24. In combination, a tractor, and a harvesting machine for beets and the like directly connected to the tractor for free floating and lateral movement in its ground-working position.

25. In combination, a tractor, a harvesting machine for beets and the like directly connected to the tractor for free floating and lateral movement in its ground-working position, and gauge means for regulating the working depth of the machine.

26. In combination, a tractor having drive wheels, a harvesting machine for beets and the like connected to the tractor, and gauge means for the machine adapted to follow the tractor in off-set relationship with respect to the tractor drive wheels.

27. In combination, a tractor, a harvesting machine for beets and the like loosely connected at one location on the tractor to be pulled thereby, power means on the tractor to lift and lower the machine with respect to its ground-working position, means for connecting the harvesting machine with the power means to permit substantially free floating and lateral movement of the machine in its ground-working position, and a single wheel for supporting the machine in its ground-working position and for controlling the lateral movement thereof.

28. In combination, a tractor having drive wheels, a harvesting machine for beets and the like loosely connected at one location on the tractor to be pulled thereby, power means on the tractor to lift and lower the machine with respect to its ground-working position, means for connecting the harvesting machine with the power means for substantially free floating and lateral movement of the machine in its ground-working position, and a single supporting wheel for the machine adapted to follow the tractor in offset relationship with respect to the tractor drive wheels and to control the lateral movement of the machine.

29. In combination, a tractor of the tricycle type with its steering wheels forward of the drive wheels, a harvesting machine for beets and the like loosely connected to the tractor to be pulled thereby from a point intermediate the steering and drive wheels of the tractor, power means on the tractor to lift and lower the machine with respect to its ground-working position, means for connecting the harvesting machine with the power means for substantially free floating and lateral movement of the machine in its ground-working position, and a single supporting wheel at the rear of the machine adapted to follow the tractor in offset relationship with respect to the tractor drive wheels and to control the lateral movement of the machine.

30. In combination, a tractor, a harvesting machine for beets and the like loosely connected to the tractor to be pulled thereby, a single means for supporting the machine in its ground-working position, power means on the tractor to lift and lower the machine with respect to its ground-working position, and means for connecting the machine with the power means to permit substantially free floating and lateral movement of the machine in its ground-working position and to maintain the level of the machine.

31. In combination, a tractor, a harvesting machine for beets and the like loosely connected with the tractor at locations thereon to permit substantially free floating and lateral movement of the machine in its ground-working position, a single supporting means for the machine, and means at one of the locations for connecting the machine with the tractor being such as to maintain the level of the machine with respect to the ground and about the single supporting means.

32. In combination, a tractor, a harvesting machine for beets and the like loosely connected with the tractor at locations thereon to permit substantially free floating and lateral movement of the machine in its ground-working position, a single supporting means for the machine, means at one of the locations for connecting the machine with the tractor being such as to maintain the level of the machine with respect to the ground, and power means on the tractor connected with said level means to lift the machine from its ground-working position by means thereof but having a lost motion to permit the floating movement of the machine in the ground-working position.

33. In combination, a tractor with a steerable support means forward of its drive wheels, a harvesting machine for beets and the like loosely connected to the tractor to be pulled thereby from a point intermediate the steering and drive wheels of the tractor, the machine extending to a location rearwardly of the drive wheels of the tractor, a single means for supporting the rear of the machine in its working position, and means at the rear of the tractor for connecting the machine thereto substantially midway of the length of the machine between the forward point of connection and the supporting means, said means being such as to maintain the level of the machine with respect to the ground and about the single supporting means.

34. In combination, a tractor having a rear axle, a harvesting machine for beets and the like loosely connected to the tractor in advance of the rear axle to have free floating and lateral movement in its working position and extending rearwardly to a location in rear of the tractor, a single means for supporting the machine in its working position, a transversely extending rock-shaft on the rear axle adapted to be free when the machine is in its working position, transversely spaced arms carried by the rock-shaft and respectively connected with the harvesting machine at each side thereof whereby through the rock-shaft the machine is maintained level with respect to the ground and about the single supporting means, when the machine is in its working position.

WILLIAM S. GRAHAM.